(12) United States Patent
Liu

(10) Patent No.: US 8,066,329 B2
(45) Date of Patent: Nov. 29, 2011

(54) CAR SEAT HEAD REST WITH BUILT-IN SCREEN

(76) Inventor: Edward Liu, City of Industry, CA (US)

( * ) Notice: Subject to any disclaimer, the term of this patent is extended or adjusted under 35 U.S.C. 154(b) by 247 days.

(21) Appl. No.: 12/288,952

(22) Filed: Oct. 24, 2008

(65) Prior Publication Data

US 2009/0091164 A1 Apr. 9, 2009

Related U.S. Application Data

(63) Continuation-in-part of application No. 11/591,197, filed on Oct. 31, 2006, now Pat. No. 7,597,394.

(51) Int. Cl.
*A47C 7/72* (2006.01)
*A47C 7/36* (2006.01)
(52) U.S. Cl. ............. 297/407; 297/217.3; 297/406; 297/410
(58) Field of Classification Search ............. 297/217.3, 297/391, 406, 407, 410
See application file for complete search history.

(56) References Cited

U.S. PATENT DOCUMENTS

| | | | |
|---|---|---|---|
| 6,022,078 A * | 2/2000 | Chang | 297/391 |
| 6,623,073 B2 * | 9/2003 | Schafer et al. | 297/216.12 |
| 6,883,870 B2 * | 4/2005 | Jost | 297/391 |
| 7,066,544 B2 * | 6/2006 | Tseng | 297/391 |
| 2006/0079306 A1 * | 4/2006 | Zheng | 455/575.9 |

* cited by examiner

*Primary Examiner* — David Dunn
*Assistant Examiner* — Philip Gabler
(74) *Attorney, Agent, or Firm* — Raymond Y. Chan; David and Raymond Patent Firm

(57) ABSTRACT

A car seat head rest, which is adapted for mounting on a car seat having two spaced apart retention slots, includes a head pillow, a display screen supported at the rear side of the head pillow, and an adjustable mounting arrangement including a length-adjustable sliding guider longitudinally supported within the interior cavity of the head pillow, a supporting frame having two overlapped sliding panels and two supporting arms downwardly and parallelly extended from the sliding panels respectively through the bottom side of the head pillow to define an engaging distance between the two supporting arms, and an adjuster provided at the sliding guider to control a length of the sliding guider so as to selectively adjust the engaging distance of the supporting arms for slidably engaging with the two retention slots respectively so as to securely support the head pillow on the car seat.

11 Claims, 15 Drawing Sheets

US 8,066,329 B2

CAR SEAT HEAD REST WITH BUILT-IN SCREEN

CROSS REFERENCE OF RELATED APPLICATION

This is a CIP application of a non-provisional application having an application Ser. No. 11/591,197 and a filing date of Oct. 31, 2006 now U.S. Pat. No. 7,597,394.

BACKGROUND OF THE PRESENT INVENTION

1. Field of Invention

The present invention relates to car seat head rest, and more particularly to a car seat head rest with built-in screen which is adapted for fitting into any type of car seat to provide an added entertainment system for the car.

2. Description of Related Arts

Every car nowadays has a car seat head rest installed on its car seat. A conventional head rest for car seat comprises a head pillow and two parallel supporting rods downwardly extended from the head pillow to slidably engage with two retention slots of the car seat. Accordingly, as different car models have different sizes of car seat, a specific dimensioned head rest might be tailor-made for the specific car seat. In other words, the distance between the two supporting rods of the head rest must match with a distance between the two retention slots of the car seat. Therefore, the driver cannot selectively switch the head rest from one car to another car.

In addition, most cars are modified to build a LCD screen at the rear side of the head rest for entertainment. However, the LCD screen must be incorporated with the original manufactured head rest. Since the original manufactured head rest is mainly made for supporting the head of the driver, the LCD screen does not provide any rigid frame structure to support LCD screen. In other words, such head rest which has the LCD screen often has problem with the LCD screen damaging from vibration and external shocks as the vehicle experience obstacles along the road. It is because the supporting frame which holds the LCD screen provides a lot of freedom for the LCD screen to move around inside the head rest and thus damaging the electronic components of the LCD screen.

SUMMARY OF THE PRESENT INVENTION

A main object of the present invention is to provide a car seat head rest with built-in screen which allows the head rest to be installed in any type of car seat.

Another object of the present invention is to provide a car seat head rest with built-in screen, wherein two parallel supporting arms are adjustable with a distance therebetween to match with two retention slots of the car seat, such that the car seat head rest is adapted to be self-adjusted to fittedly incorporating with any size or type of car seat.

Another object of the present invention is to provide a car seat head rest which the mounting mechanism is highly resistant to vibration and external impacts thus ensuring the head rest can be firmly mounted onto the car seat.

Another object of the present invention is to provide a car seat head rest with built-in screen to provide entertainment to passengers without alternating the original structure of the car seat.

Another object of the present invention is to provide a car seat head rest with built-in screen which is stably installed within the head rest to protect its electronic components from vibration and external impacts.

Another object of the present invention is to provide a car seat head rest, wherein two sliding panels are coupled with the supporting arms to enhance the support of the supporting frame so as to substantially and securely retain the display screen in position.

Another object of the present invention is to provide a car seat head rest, wherein the sliding panels even distribute the applying force to the head pillow so as to extend the life-span of the car seat head rest.

Another object of the present invention is to provide a car seat head rest, wherein the supporting arms are moving in a synchronized manner via the sliding panels so as to provide a smooth and stabilize way to adjust the distance between two sliding arms.

Accordingly, in order to accomplish the above objects, the present invention provides an adjustable car seat head rest adapted for mounting on a car seat having two spaced apart retention slots, comprising a head pillow having a rear side, a bottom side and an interior cavity, a display screen supported at the rear side of the head pillow, and an adjustable mounting arrangement.

The adjustable mounting arrangement comprises:

a length-adjustable sliding guider longitudinally supported within the interior cavity of the head pillow;

a supporting frame, which is coupled with the sliding guider, comprising two overlapped sliding panels supported in the interior cavity of the head pillow in a slidably movable manner and two supporting arms downwardly and parallelly extended from the sliding panels respectively through the bottom side of the head pillow to define an engaging distance between the two supporting arms; and an adjuster provided at the sliding guider to control a length of the sliding guider so as to selectively adjust the engaging distance of the supporting arms, wherein when the engaging distance of the supporting arms is adjusted corresponding to a distance between the two retention slots of the car seat, the two supporting arms are adapted for slidably engaging with the two retention slots respectively so as to securely support the head pillow on the car seat.

These and other objectives, features, and advantages of the present invention will become apparent from the following detailed description, the accompanying drawings, and the appended claims.

DETAILED DESCRIPTION OF THE PREFERRED EMBODIMENT

Figure 1:
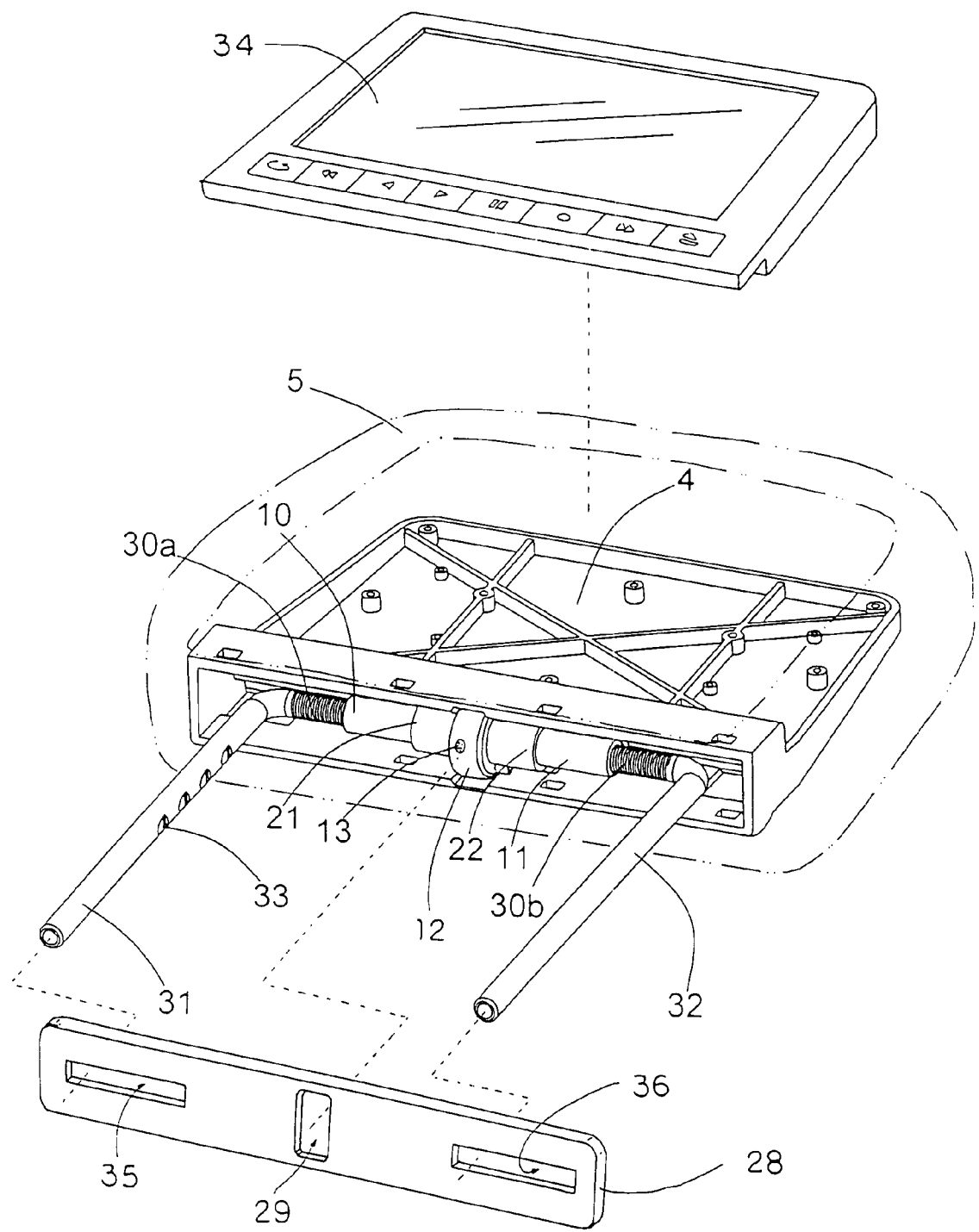
FIG. 1 is an exploded perspective view of a car seat head rest for mounting on a car seat with the display screen according to a preferred embodiment of the present invention.
Figure 3:
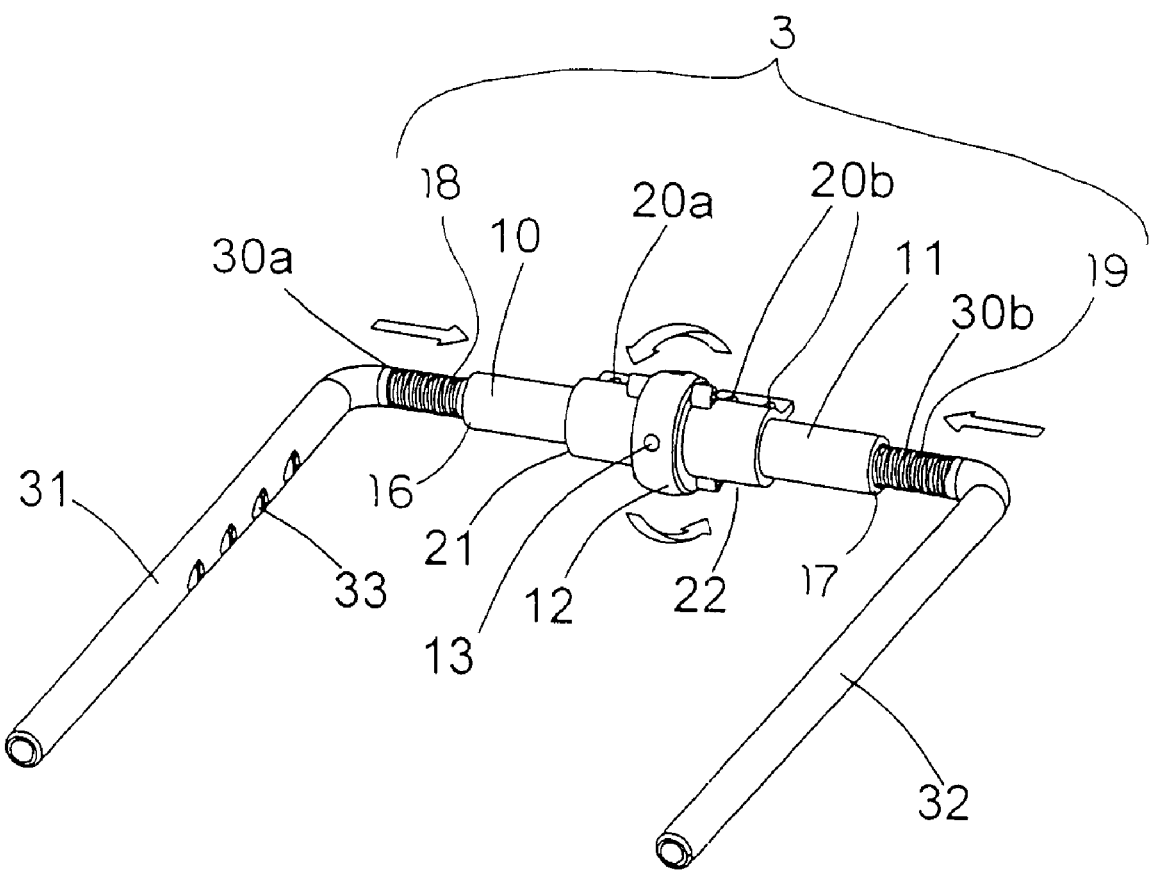
FIG. 3 is a perspective view of the adjustable mounting arrangement illustrating a rotation of the manual tuner that minimizes the engaging distance according to the preferred embodiment of the present invention.
Figure 4:
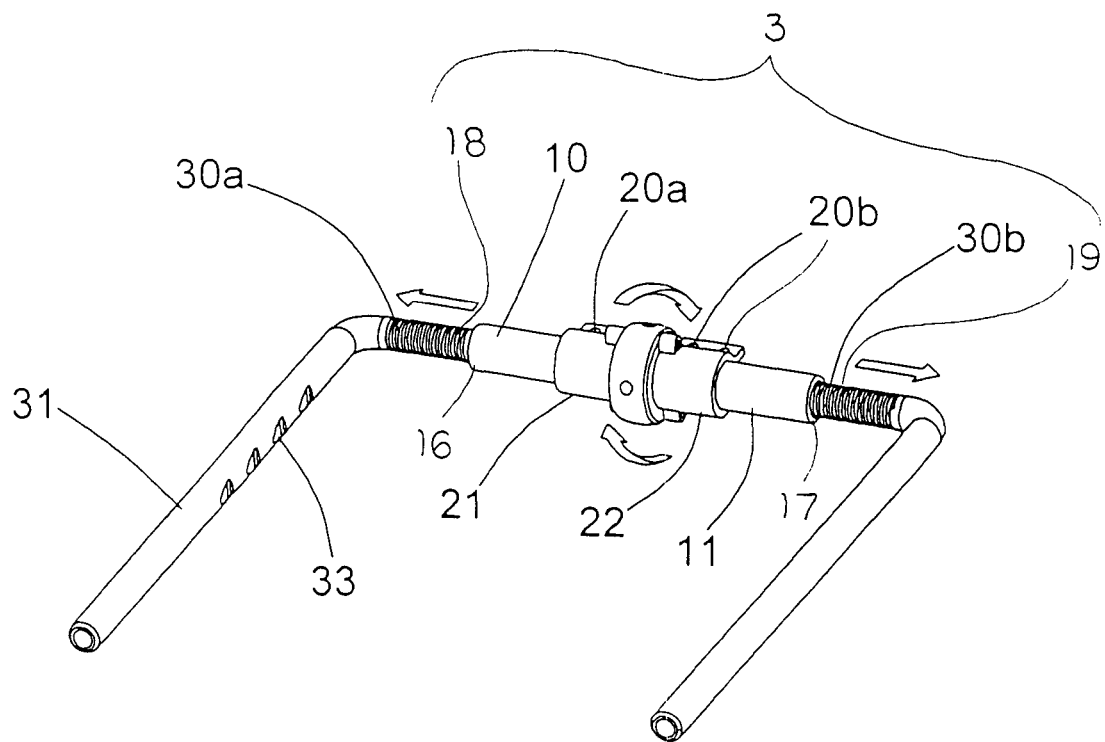
FIG. 4 is a perspective view of the adjustable mounting arrangement illustrating a rotation of the manual tuner that maximizes the engaging distance according to the preferred embodiment of the present invention.
Figure 5:
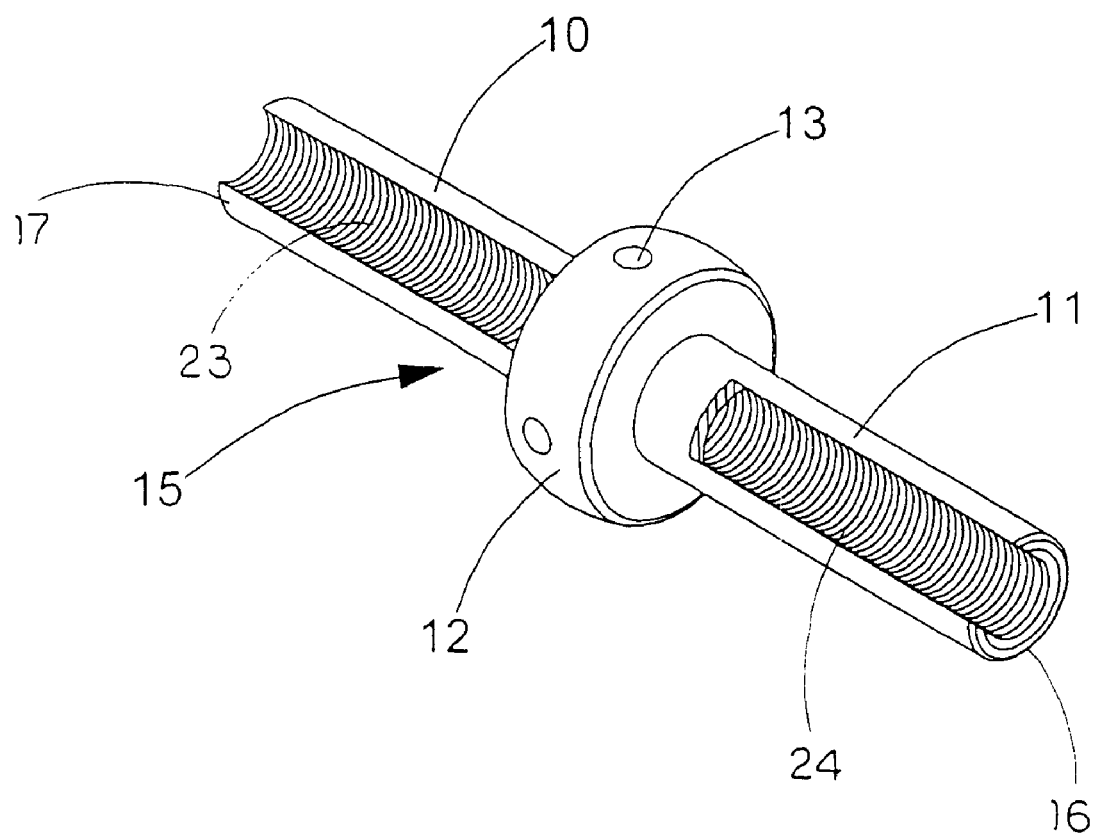
FIG. 5 is a perspective view of the control sleeves illustrating the two inner thread portions.
Figure 8:
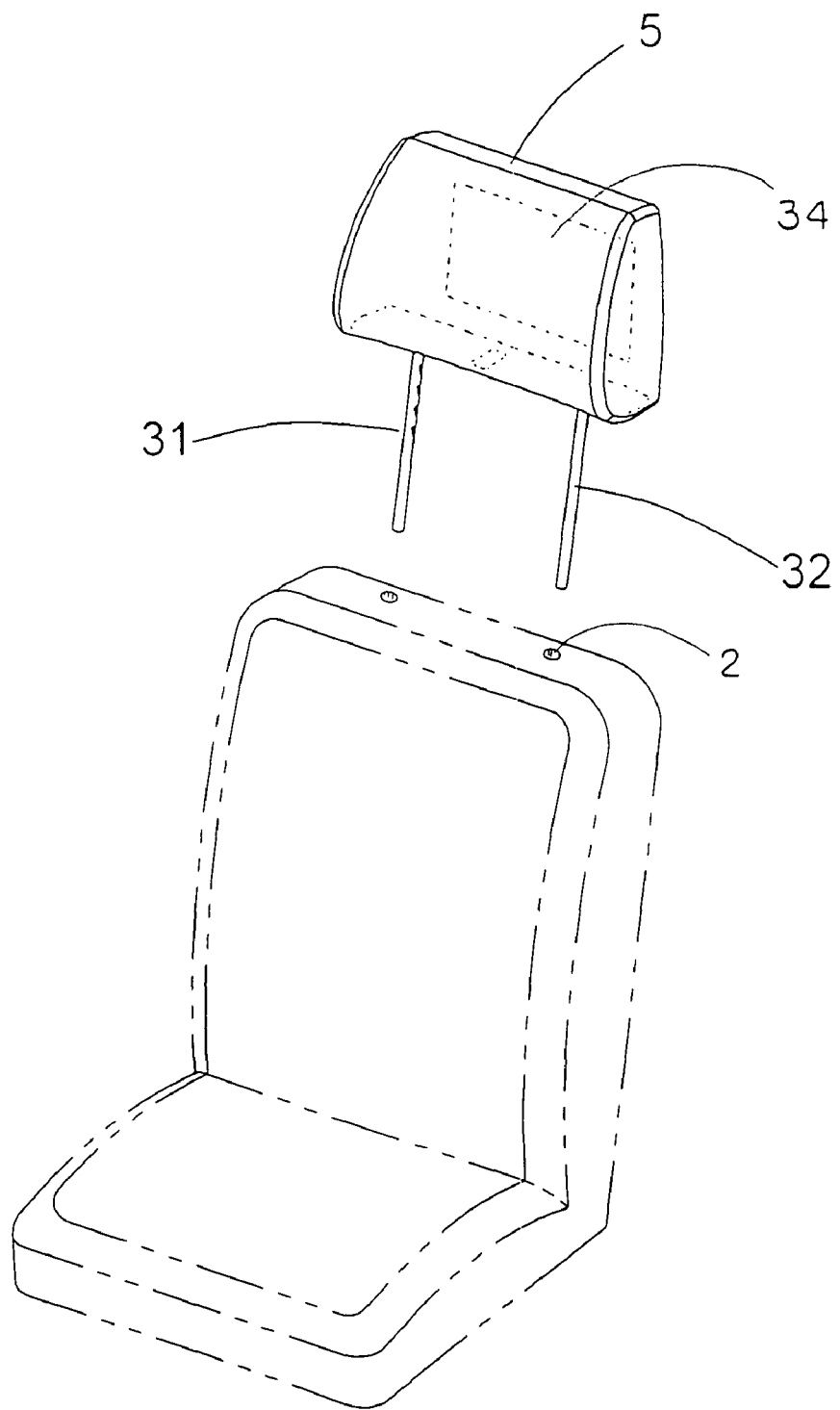
FIG. 8 is a perspective view of the car seat head illustrating the mounting arrangement onto the car seat.

According to the preferred embodiment of the present invention as shown in FIGS. 1 and 8 of the drawings, a car seat head rest for mounting on a car seat having two spaced apart retention slot 2 comprises a head pillow 5 having a rear side, a bottom side, and an interior cavity. The car seat headrest further comprises an adjustable mounting arrangement having a length-adjustable sliding guider 3 longitudinally supported within the interior cavity of the head pillow 5 as shown in FIGS. 3 and 4 of the drawings and two supporting arms 31, 32 downwardly and parallelly extended from the sliding guider 3 respectively through the bottom side of the head pillow 5 to define an engaging distance between the two supporting arms 31, 32. The two supporting arms 31, 32 are usually made of stainless steel so that they are strong; highly corrosion resisted, and can withstand any shocks and vibration from the moving vehicles when they are mounted on the car seat through the retention slots 2.

Figure 2:
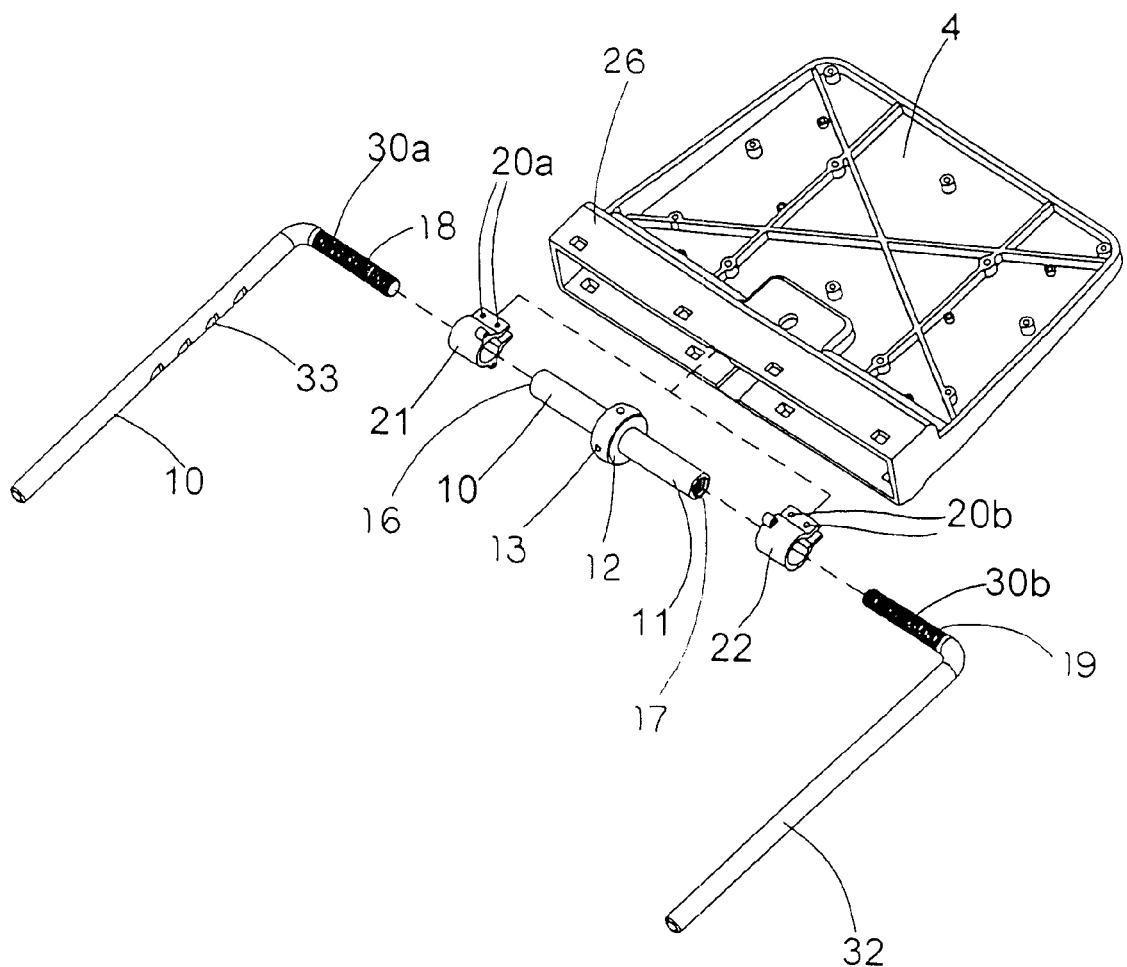
FIG. 2 is an exploded perspective view of the car seat head rest according to the preferred embodiment of the present invention.

According to FIG. 2 of the drawings, the car seat head rest further comprises an adjuster 12 provided at the sliding guider 3 to control a length of the sliding guider 3 so as to selectively adjust the engaging distance of the supporting arms 31, 32. When the engaging distance of the supporting arms 31, 32 is adjusted corresponding to a distance between the two retention slots 2 of the car seat, the two supporting arms 31, 32 are adapted for slidably engaging with the two retention slots 2 of the car seat respectively so as to securely support the head pillow 5 on the car seat. The supporting arms 31, 32 further has a plurality of slot 33 installed along thereon to couple with the two retention slot 2s 2 such that the height of the car seat head rest can be adjusted.

The car seat head further comprises a display screen 34 built-in at the rear side of the head pillow 5. The adjustable mounting arrangement further comprises a supporting frame 4 upwardly extended from the sliding guider 3 within the interior cavity of the head pillow 5 to support the display screen 34 at the rear side of the head pillow 5 so as to substantially retain the display screen 34 in position. The display screen 34 provides entertainment to the passengers behind the car seat head rest such as playing a DVD movie or TV.

The two supporting arms 31, 32 are two hollow arms respectively that a communication cable of the display screen 34 is extended through one of the supporting arms 31, 32 so as to protectively conceal the communication cable within the respective supporting arm 31, 32. Therefore, the communication cable can provide signals and power required for the display screen 34 and is hidden inside the two supporting arms 31, 32 so as to keep an aesthetic appearance.

According to FIG. 2-5 of the drawings, the adjuster 12 further comprises a control sleeve 10, 11 having two side opening ends 16, 17. The sliding guider 3 comprises two sliding shafts 18, 19 engaging with the control sleeve 10, 11 at a position that inner ends of the sliding shafts 18, 19 are coaxially and slidably engaging with the side opening ends 16, 17 of the control sleeve respectively. While outer ends of the sliding shafts 18, 19 are securely attached to the supporting arms 31, 32 in such a manner that when the inner ends of the two sliding shafts 18, 19 are coaxially slid within side opening ends 16, 17 of the control sleeve 10, 11 respectively in a synchronized manner, the supporting arms 31, 32 are correspondingly moved to control the engaging distance between the two supporting arms 31, 32.

The control sleeve 10, 11 has two inner thread portions 23, 24 provided at the two opening ends 16, 17 respectively. Each of the sliding shafts 18, 19 has an outer threaded 30a, 30b portion slidably engaging with the corresponding inner thread portion 23, 24 of the control sleeve 10, 11. When the control sleeve 10, 11 is driven to rotate, the sliding shafts 18, 19 are slid correspondingly to control the engaging distance between the two supporting arms 31, 32.

The two inner thread portions 23, 24 of the control sleeve 10, 11 are extended in opposite spiral direction such that when the control sleeve 10, 11 is rotated at a clockwise direction, the sliding shafts 18, 19 are synchronically slid towards each other to minimize the engaging distance between the two supporting arms 31, 32. When the control sleeve 10, 11 is rotated at a counter clockwise direction, the sliding shafts 18, 19 are synchronically slid away from each other to maximize the engaging distance between the two supporting arms 31, 32.

The adjuster 12 further comprises a manual turner 13, which is coaxially mounted to the control sleeve 10, 11, having a manipulating portion extending out of the interior cavity of the head pillow 5 through the bottom side thereof to drive the control sleeve 10, 11 to rotate. A manipulating tool is used to rotate the manual tuner 13 to turn the adjuster 12 such that the control sleeve 10, 11 can be rotated in the clockwise or counter clockwise depending on which way the adjuster is rotated so as to adjust the engaging distance between the two supporting arms 31, 32. FIG. 3 displays the rotation of the adjuster 12 to minimize the engaging distance between the two supporting arms 31, 32. FIG. 4 displays the rotation of the adjuster 12 to maximize the engaging distance between the two supporting arms 31, 32.

The supporting frame 4 comprises a supporting panel supported within the interior cavity of the head pillow 5 to rigidly support the display screen 34 and a base housing 26 pivotally coupling with the sliding guider 3 in such a manner that the head pillow 5 is pivotally moved for adjusting a head-supporting angle of the head pillow 5 with respect to the car seat when the supporting arms 31, 32 are slidably inserted into the retention slots 2 of the car seat respectively.

Figure 6:
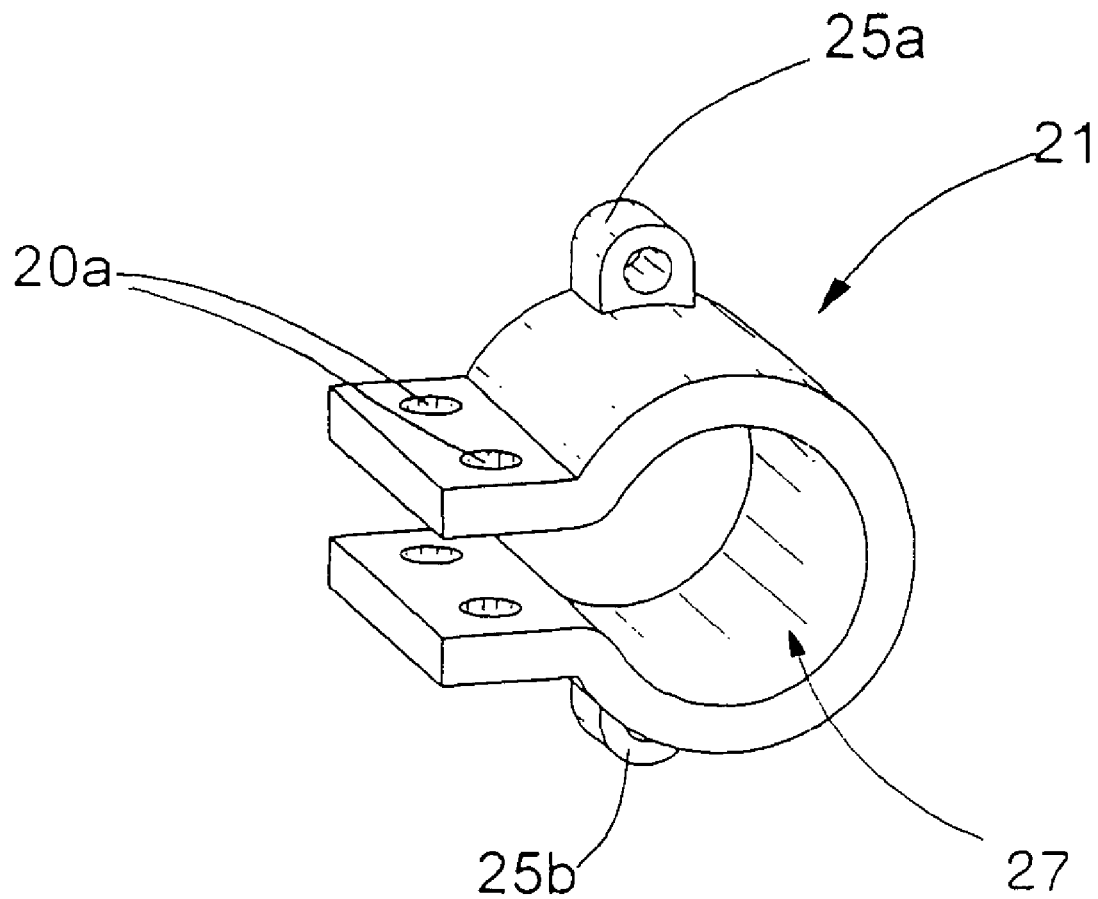
FIG. 6 is a perspective view of the U-shaped reinforcing brackets.
Figure 7:
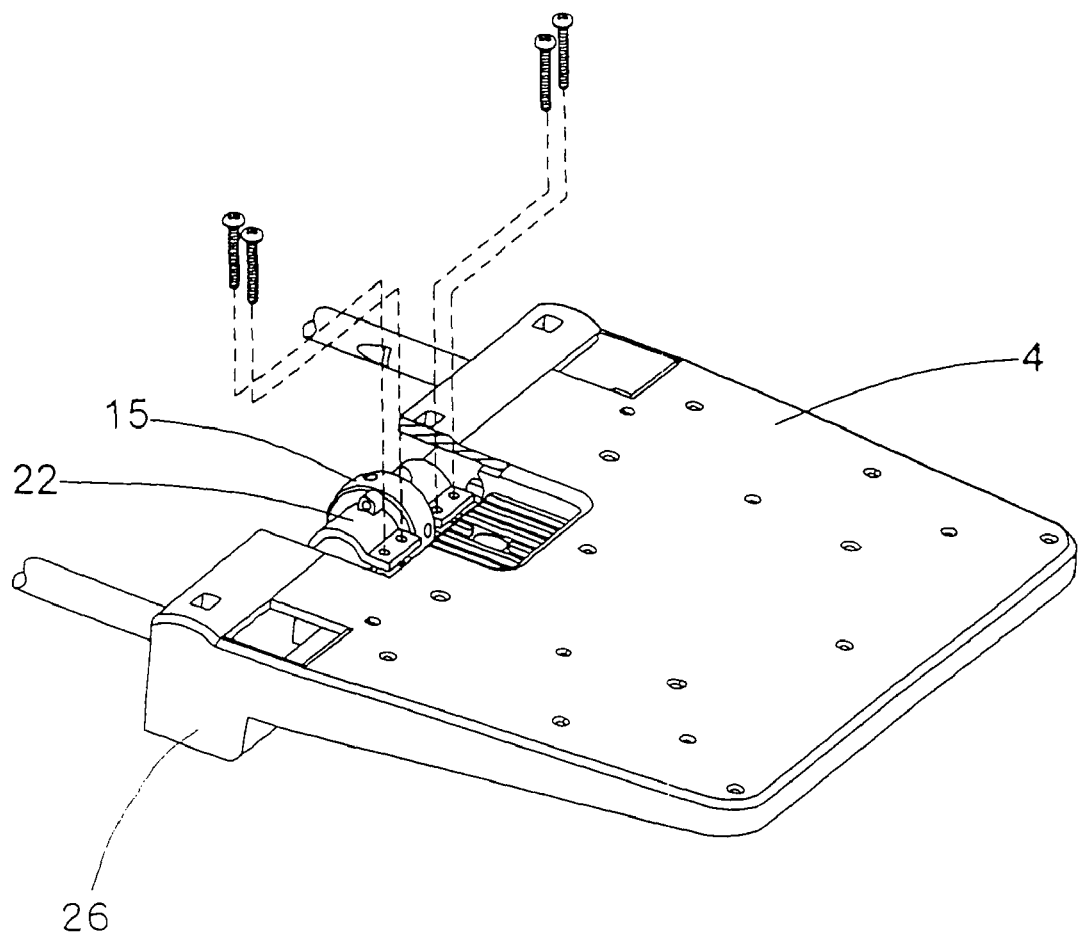
FIG. 7 is a perspective view of the supporting frame and the base housing illustrating the mounting arrangement of the reinforcing brackets.

According to FIGS. 2 and 6 of the drawings of the preferred embodiment, the base housing 26 further comprises two U-shaped reinforcing brackets 21, 22. Each of the U-shaped reinforcing brackets 21, 22 has a reinforcing slot 27, mounted at two sidewalls of the head pillow 5 respectively at a position that the two supporting arms 31, 32 are extended from the sliding guider 3 through the reinforcing slots 27 of the reinforcing brackets 21, 22 respectively. The reinforcing brackets 21, 22 not only reinforce the head pillow 5 but also limit the head-supporting angle of the head pillow 5 by a width of each of the reinforcing slots 27. The reinforcing brackets 21, 22 are firmly mounted onto the base housing 26 through a plurality of reinforcing hole 20a, 20b, 25a, 25b by use of simple bolts and screws.

The car seat head set comprising a bottom enclosing cover 28 mounted at the bottom side of the head pillow 5 to enclose the interior cavity thereof. The enclosing cover has a tuner opening 29 for the manipulating portion of the manual turner 13 protruding therefrom such that the manual turner 13 can be easily rotated by the user. The enclosing cover 28 further has two elongated arm openings 35, 36 for the supporting arms 31, 32 extending out of the bottom side of the head pillow 5 through the arm opening 35, 36 respectively. The enclosing cover 28 provides a better protection for the display screen 34 and the adjustable mounting arrangement against dirt and impact.

Figure 9:
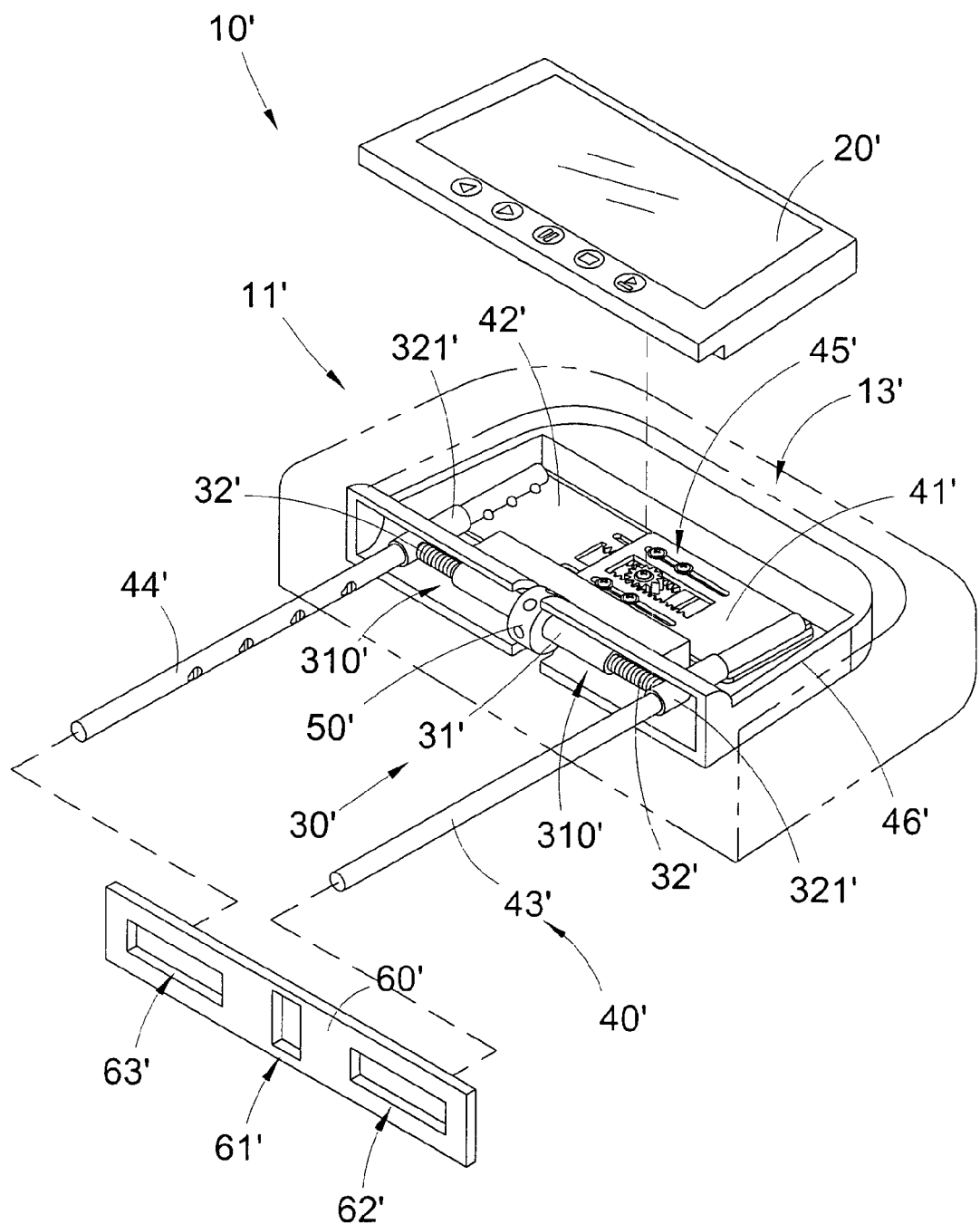
FIG. 9 is an exploded perspective view of a car seat head rest for mounting on a car seat with the display screen according to a second preferred embodiment of the present invention.

Referring to FIG. 9, car seat head rest of a second embodiment illustrates an alternative mode of the first embodiment of the present invention, wherein the car seat head rest comprises a head pillow 10' having a rear side 11', a bottom side 12' and an interior cavity 13', and a display screen 20' supported at the rear side 11' of the head pillow 10'.

The car seat head rest further comprises an adjustable mounting arrangement which comprises a length-adjustable sliding guider 30' longitudinally supported within the interior cavity 13' of the head pillow 10', a supporting frame 40' coupled with the sliding guider 30', and an adjuster 50' provided at the sliding guider 30'.

The supporting frame 40' comprises two overlapped sliding panels 41', 42' supported in the interior cavity 13' of the head pillow 10' in a slidably movable manner and two supporting arms 43', 44' downwardly and parallelly extended from the sliding panels 41', 42' respectively through the bottom side 12' of the head pillow 10' to define an engaging distance between the two supporting arms 43', 44'.

The adjuster 50' is provided at the sliding guider 30' to control a length of the sliding guider 30' so as to selectively adjust the engaging distance of the supporting arms 43', 44', wherein when the engaging distance of the supporting arms 43', 44' is adjusted corresponding to a distance between the two retention slots 2 of the car seat, the two supporting arms 43', 44' are adapted for slidably engaging with the two retention slots 2 respectively so as to securely support the head pillow 10' on the car seat.

According to the preferred embodiment, the sliding guider 30' comprises a control sleeve 31' having two side opening ends 310' and two sliding shafts 32' slidably engaging with the control sleeve 310' at a position that inner ends of the sliding shafts 32' are coaxially and slidably engaging with the side opening ends 310' of the control sleeve 31' respectively while outer ends of the sliding shafts 32' are coupled with the supporting arms 43', 44' respectively in such a manner that when the inner ends of the two sliding shafts 32' are coaxially slid within side opening ends 310' of the control sleeve 31' respectively, the supporting arms 43', 44' are correspondingly moved to control the engaging distance between the two supporting arms 43', 44'.

Figure 10:
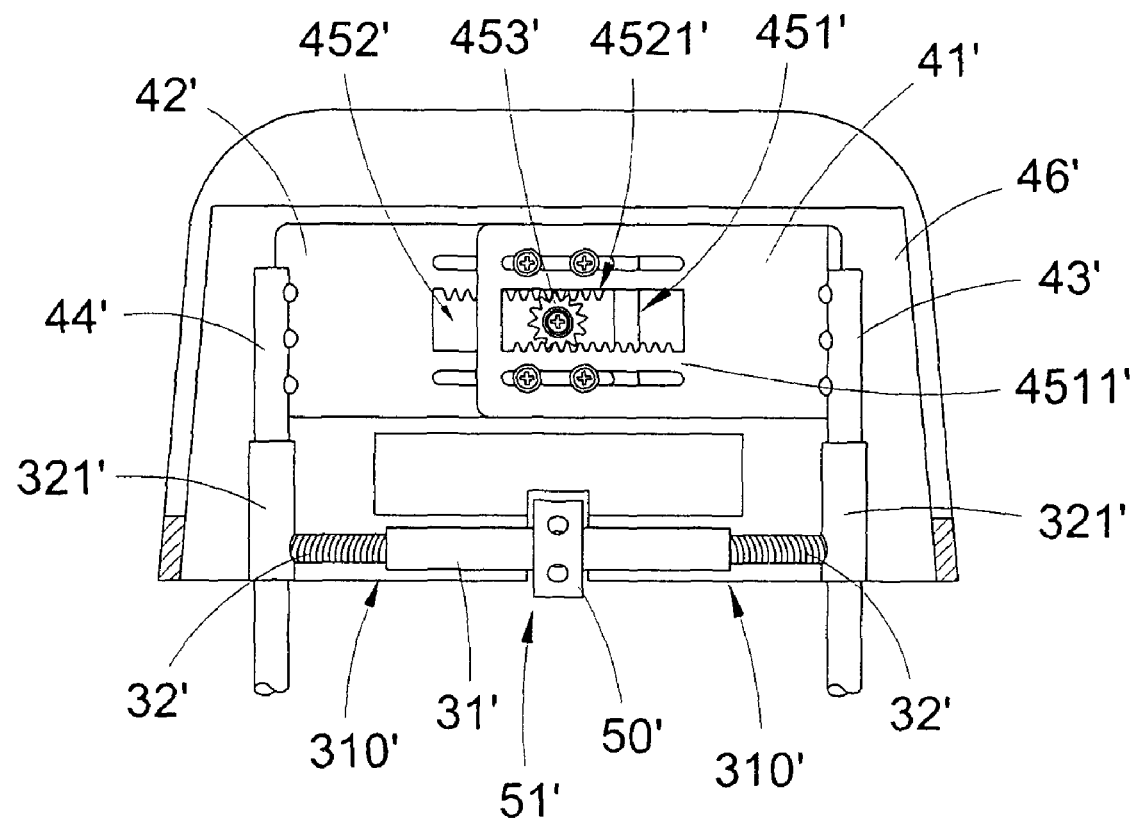
FIG. 10 is sectional view of the car seat head rest according to the second preferred embodiment of the present invention.

As shown in FIGS. 9 and 10, the control sleeve 31' has two inner thread portions provided at the two opening ends 310' respectively, wherein each of the sliding shafts 32' has an outer threaded portion slidably and rotatably engaging with the corresponding inner thread portion of the control sleeve 31', such that when the control sleeve 31' is driven to rotate via the adjuster 50', the sliding shafts 32' are slid correspondingly in a synchronized manner to control the engaging distance between the two supporting arms 43', 44'.

The two inner thread portions of the control sleeve 31' are extended in opposite spiral direction such that when the control sleeve 31' is rotated at a clockwise direction, the sliding shafts 32' are synchronically slid towards each other to minimize the engaging distance between the two supporting arms 43', 44'. When the control sleeve 31' is rotated at a counter clockwise direction, the sliding shafts 32' are synchronically slid away from each other to maximize the engaging distance between the two supporting arms 43', 44'.

The two supporting arms 43', 44' are two hollow arms respectively that a communication cable of the display screen 20' is extended through one of the supporting arms 43', 44' so as to protectively conceal the communication cable within the respective supporting arm 43', 44'. Therefore, the communication cable can provide signals and power required for the display screen 20' and is hidden inside the two supporting arms 43', 44' so as to keep an aesthetic appearance.

Accordingly, the upper end portions of the supporting arms 43', 44' are affixed to the sliding panels 41', 42' respectively. The outer ends of the sliding shafts 32' are coupled with the mid-portions of the supporting arms 43', 44' respectively such that when the sliding shafts 32' are slid correspondingly in a synchronized manner to control the engaging distance between the two supporting arms 43', 44', the sliding panels 41', 42' are correspondingly slid with each other to ensure the two supporting arms 43', 44' being slid parallel to each other.

In order to couple the outer ends of the sliding shafts 32' are coupled with the mid-portions of the supporting arms 43', 44' respectively, the outer ends of the sliding shafts 32' are formed as two tubular sleeves 321' to coaxially couple with the supporting arms 43' 44' respectively. In other words, the supporting arms 43', 44' are coaxially slid through the tubular sleeves 321' to be driven when the sliding shafts 32' are rotated in responsive to the control sleeve 31'.

The adjuster 50' comprises a manual turner, which is coaxially mounted to the control sleeve 31', having a manipulating portion 51' extending out of the interior cavity 13' of the head pillow 10' through the bottom side 12' thereof to drive the control sleeve 31' to rotate. The manipulating portion 51' of the adjuster 50' is arranged to be rotated to turn the control sleeve 31' such that the control sleeve 31' can be rotated in the clockwise or counter clockwise depending on which way the adjuster 50' is rotated so as to adjust the engaging distance between the two supporting arms 43' 44'.

Preferably, the sliding panels 41', 42' are partially overlapped with each other wherein two outer edges of the sliding panels 41', 42' are affixed to the upper portions of the supporting arms 43', 44' respectively. Accordingly, when the sliding panels 41', 42' are slid with each other, the supporting arms 43', 44' are moved correspondingly. The sliding panels 31', 32' are preferably two metal panels that the sliding panels 41', 42' are supported within the interior cavity 13' of the head pillow 10' to rigidly support the display screen 20' and the head pillow 10'. It is worth to mention that the sliding panels 41', 42" not only rigidly support the head pillow 10' but also provide a stable sliding movement of each of the supporting arms 43', 44' in a synchronized manner. Therefore, the sliding panels 41', 42' enhance the support of the head pillow 10' to substantially and securely retain the display screen 20' in position and evenly distribute the applying force to the adjuster 50' to drive the supporting arms 43', 44' to move in a synchronized manner.

The supporting frame 40' further comprises a sliding enhancement unit 45' for enhancing a sliding movement between the two sliding panels 41', 42', wherein the sliding enhancement unit 45' contains two sliding slots 451', 452' provided at the sliding panels 41', 42' to align with each other and comprises a driving gear 453' rotatably engaging with the sliding slots 451', 452' to enhance the sliding movement between the sliding panels 41', 42' in a synchronized manner.

Figure 11:
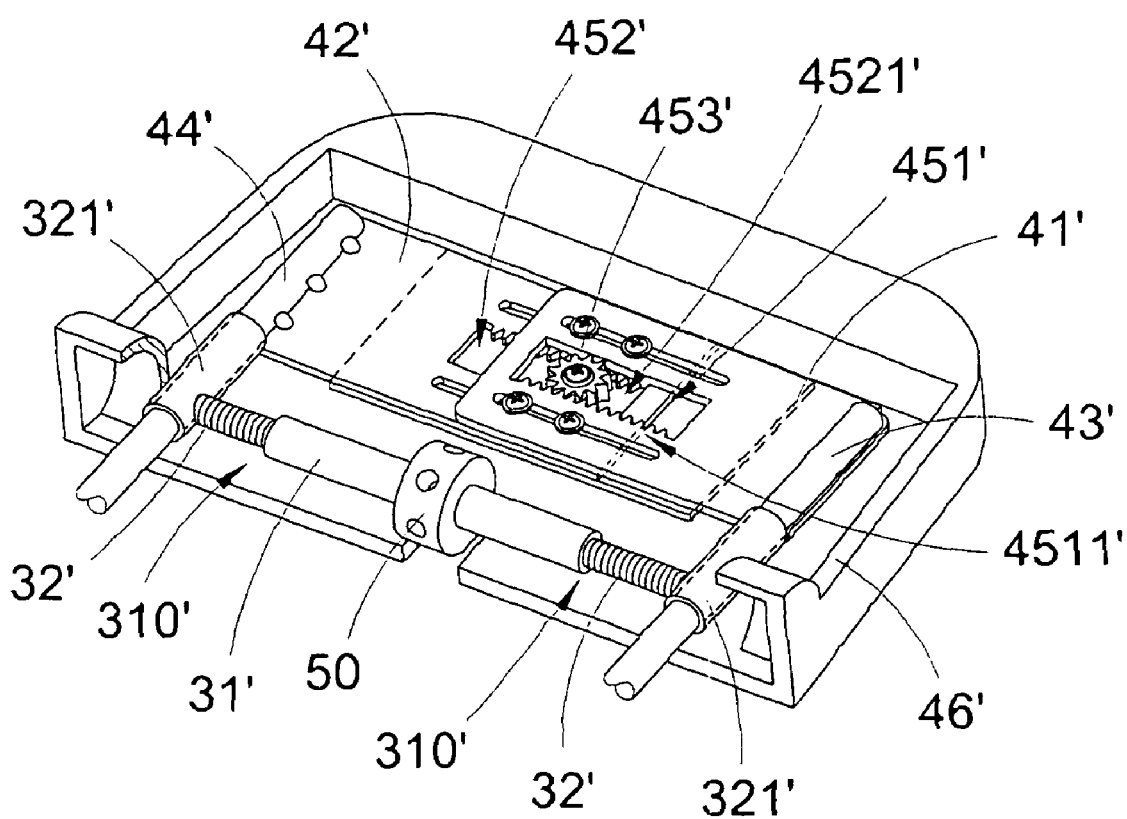
FIG. 11 is a perspective view of the sliding enhancing unit according to the second preferred embodiment of the present invention.

As shown in FIGS. 10 and 11, one of the sliding slots 451' has a bottom teething edge 4511' engaging with a portion of a teething circumferential edge of the driving gear 453' while another sliding slot 452' has a top teething edge 4521' engaging with an opposed portion of the teething circumferential edge of the driving gear 453' such that the sliding panels 41', 42' are correspondingly slid with each other in a synchronized manner.

The thickness of the driving gear 453' should be larger than an overall thickness of the sliding panels 41', 42 such that when the sliding panels 41', 42' are overlapped, the driving gear 453' is rotatably engaged with the sliding slots 451', 452' of the sliding panels 41', 42'.

Accordingly, the bottom portion of the teething circumferential edge of the driving gear 453' is tangently engaged with the bottom teething edge 4511' of the sliding slot 451' while the top portion of the teething circumferential edge of the driving gear 453' is tangently engaged with the top teething edge 4521' of another sliding slot 452'. In other words, when the sliding panels 41', 42' are overlappedly slid with each other, the driving gear 453' is driven to rotate to synchronize the sliding movement of each of the sliding panels 41', 42'.

The supporting frame 40' comprises a base housing 46' supported within the interior cavity 13' of the head pillow 10' to rigidly support the display screen 20' at the rear side 11' of the head pillow 10', wherein the sliding panels 41', 42' are supported between a base wall of the base housing 46' and the display screen 20'.

As shown in FIG. 9, the car seat head set further comprises a bottom enclosing cover 60' mounted at the bottom side 12' of the head pillow 10' to enclose the interior cavity 13' thereof. The enclosing cover 60' has a tuner opening 61' for the manipulating portion 51' of the adjuster 50' protruding therefrom such that the adjuster 50' can be easily rotated by the user. The enclosing cover 60' further has two elongated arm openings 62', 63' for the supporting arms 43', 44' extending out of the bottom side 12' of the head pillow 10' through the arm opening 62', 63' respectively. The enclosing cover 60' provides a better protection for the display screen 20' and the adjustable mounting arrangement against dirt and impact.

Figure 12:
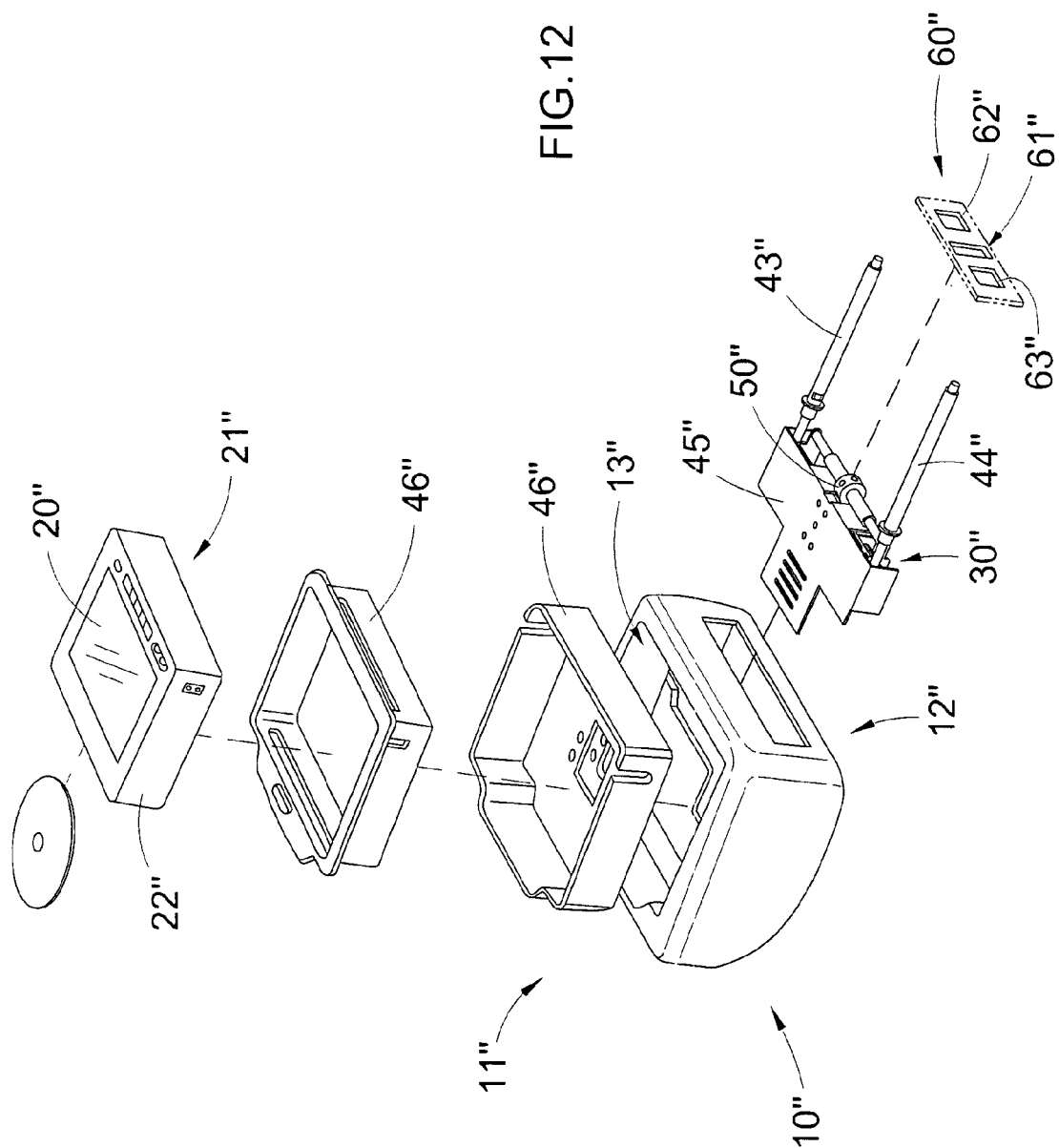
FIG. 12 is an exploded perspective view of a car seat head rest for mounting on a car seat with the display screen according to a third preferred embodiment of the present invention.

Referring to FIG. 12, a car seat head rest of a third embodiment illustrates an alternative mode of the second embodiment of the present invention. The car seat head rest comprises a head pillow 10" having a rear side 11", a bottom side 12" and an interior cavity 13", and a display screen 20" supported at the rear side 11" of the head pillow 10".

The car seat head rest further comprises an adjustable mounting arrangement which comprises a length-adjustable sliding guider 30" longitudinally supported within the interior cavity 13" of the head pillow 10", a supporting frame 40" coupled with the sliding guider 30", and an adjuster 50" provided at the sliding guider 30".

Figure 13:
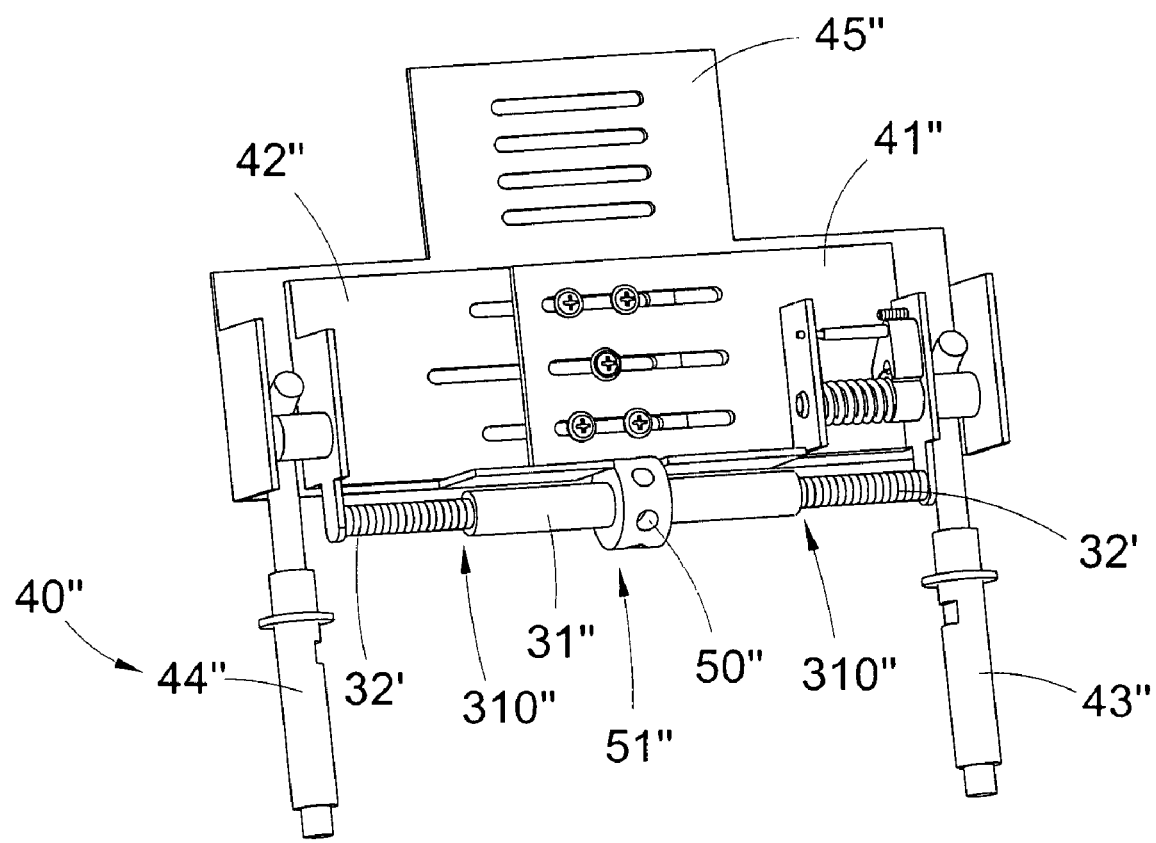
FIG. 13 is a perspective view of the car seat head rest according to the above third preferred embodiment of the present invention.

As shown in FIG. 13, the supporting frame 40" comprises two overlapped sliding panels 41", 42" supported in the interior cavity 13" of the head pillow 10" in a slidably movable manner and two supporting arms 43", 44" downwardly and parallelly extended from the sliding panels 41", 42" respectively through the bottom side 12" of the head pillow 10" to define an engaging distance between the two supporting arms 43", 44".

The adjuster 50" is provided at the sliding guider 30" to control a length of the sliding guider 30" so as to selectively adjust the engaging distance of the supporting arms 43", 44", wherein when the engaging distance of the supporting arms 43", 44" is adjusted corresponding to a distance between the two retention slots 2 of the car seat, the two supporting arms 43", 44" are adapted for slidably engaging with the two retention slots 2 respectively so as to securely support the head pillow 10' on the car seat.

According to the third embodiment, the sliding guider 30" comprises a control sleeve 31" having two side opening ends 310" and two sliding shafts 32" slidably engaging with the control sleeve 310" at a position that inner ends of the sliding shafts 32" are coaxially and slidably engaging with the side opening ends 310" of the control sleeve 31' respectively while outer ends of the sliding shafts 32' are coupled with the sliding panels 41", 42" respectively in such a manner that when the inner ends of the two sliding shafts 32" are coaxially slid within side opening ends 310" of the control sleeve 31" respectively to drive the sliding panels 41", 42" to slide with each other, the supporting arms 43", 44" are correspondingly moved through the sliding panels 41", 42" to control the engaging distance between the two supporting arms 43", 44".

As shown in FIG. 13, the control sleeve 31" has two inner thread portions provided at the two opening ends 310" respectively, wherein each of the sliding shafts 32" has an outer threaded portion slidably and rotatably engaging with the corresponding inner thread portion of the control sleeve 31", such that when the control sleeve 31" is driven to rotate via the adjuster 50", the sliding shafts 32" are slid correspondingly in a synchronized manner to control the engaging distance between the two supporting arms 43", 44".

The two inner thread portions of the control sleeve 31" are extended in opposite spiral direction such that when the control sleeve 31" is rotated at a clockwise direction, the sliding shafts 32" are synchronically slid towards each other to minimize the engaging distance between the two supporting arms 43", 44". When the control sleeve 31" is rotated at a counter clockwise direction, the sliding shafts 32" are synchronically slid away from each other to maximize the engaging distance between the two supporting arms 43", 44".

Accordingly, the upper end portions of the supporting arms 43", 44" are pivotally coupled with the sliding panels 41", 42" respectively. The outer ends of the sliding shafts 32" are coupled with two outer sides of the sliding panels 41", 42" respectively such that when the sliding shafts 32" are slid correspondingly in a synchronized manner, the sliding panels 41", 42" are correspondingly driven to overlappedly slide with each other to control the engaging distance between the two supporting arms 43", 44" so as to ensure the two supporting arms 43", 44" being slid parallel to each other. It is worth to mention that the upper end portions of the supporting arms 43", 44" are pivotally coupling with the sliding panels 41", 42" at two outer sides thereof respectively to selectively adjust a tilt angle of the head pillow 10" with respect to the car seat.

Figure 14:
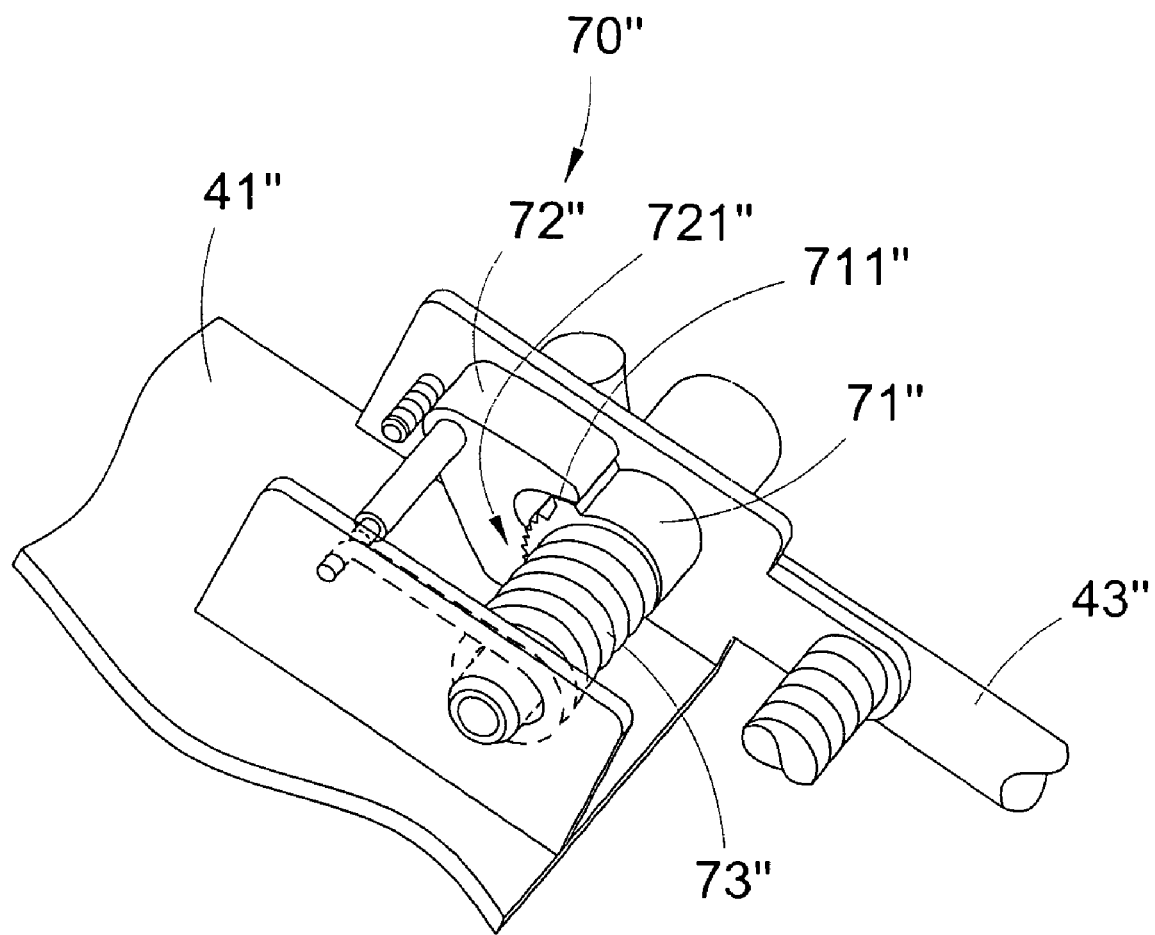
FIG. 14 is a perspective view of the angle hinge according to the above third preferred embodiment of the present invention
Figure 15:
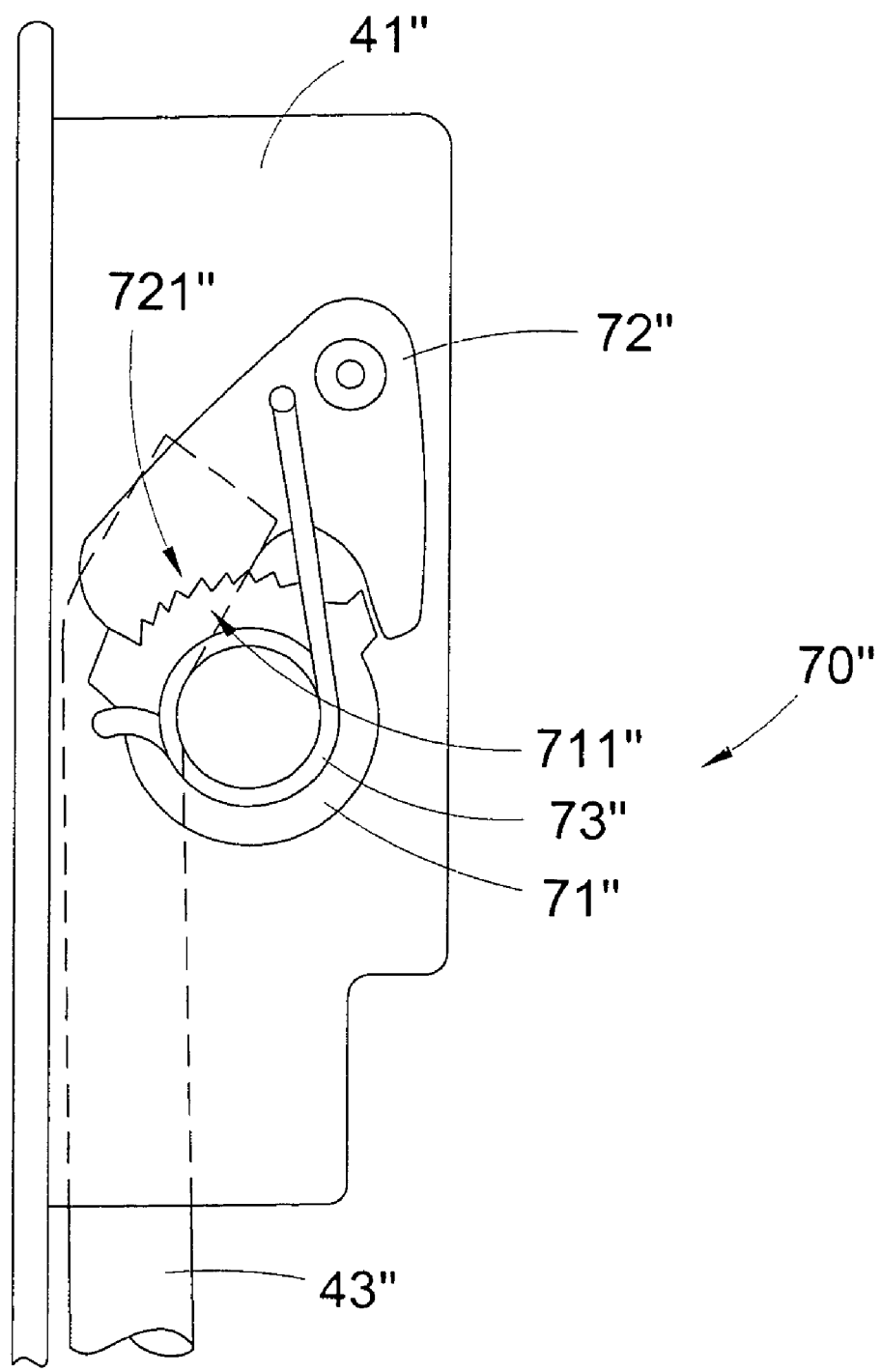
FIG. 15 is a side view of the angle hinge according to the above third preferred embodiment of the present invention.

As shown in FIGS. 13 to 15, the car seat head rest further comprises an angle hinge 70" for retaining the head pillow 10" at the tilt angle. The angle hinge 70" comprises a hinge base 71", having a first teething portion 711", coupling with one of the sliding panels 41", a folding arm 72" movably coupling with the corresponding sliding panel 41" and having a second teething portion 721' detachably engaging with the first teething portion 711" of the hinge base 71" to retain the sliding panels 41", 42" at the tilt angle, and a resilient element 73" coaxially mounted to the hinge base 71" for applying an urging force against the folding arm 72" such that when the second teething portion 721" of the folding arm 72" is disengaged with the first teething portion 711" of the hinge base 71", the resilient element 73" applies the urging force to push the head pillow 10" back to an upright position with respect to the car seat.

Accordingly, the first and second teething portions 711", 721" are configured at one direction such that when the second teething portion 721' is detachably engaged with the first teething portion 711" of the hinge base 71" to lock up the folding arm 72" in position, the head pillow 10" is retained at the tilt angle. It is worth to mention that when the head pillow 10" is pivotally folded to its maximum tilt angle, the second teething portion 721" of the folding arm 72" will be disengaged with the first teething portion 711" of the hinge base 71" to allow the head pillow 10" being returned back to its upright position.

The adjuster 50" comprises a manual turner, which is coaxially mounted to the control sleeve 31", having a manipulating portion 51" extending out of the interior cavity 13" of the head pillow 10" through the bottom side 12" thereof to drive the control sleeve 31" to rotate. The manipulating portion 51" of the adjuster 50" is arranged to be rotated to turn the control sleeve 31" such that the control sleeve 31" can be rotated in the clockwise or counter clockwise depending on which way the adjuster is rotated so as to adjust the engaging distance between the two supporting arms 43" 44".

The car seat head set further comprises a bottom enclosing cover 60" mounted at the bottom side 12" of the head pillow 10" to enclose the interior cavity 13" thereof. The enclosing cover 60" has a tuner opening 61" for the manipulating portion 51" of the adjuster 50" protruding therefrom such that the adjuster 50" can be easily rotated by the user. The enclosing cover 60" further has two elongated arm openings 62", 63" for the supporting arms 43", 44" extending out of the bottom side 12" of the head pillow 10" through the arm opening 62", 63" respectively. The enclosing cover 60" provides a better protection for the display screen 20" and the adjustable mounting arrangement against dirt and impact.

Preferably, the sliding panels 41", 42" are partially overlapped with each other wherein two outer edges of the sliding panels 41', 42' are pivotally coupled with the upper portions of the supporting arms 43", 44" respectively. Accordingly, when the sliding panels 41", 42" are slid with each other, the supporting arms 43", 44" are moved correspondingly. The sliding panels 31", 32" are preferably two metal panels that the sliding panels 41", 42" are supported within the interior cavity 13" of the head pillow 10" to rigidly support the display screen 20" and the head pillow 10".

The supporting frame 40" further comprises a supporting bracket 45" supported in the interior cavity 13" of the head pillow 10" to receive the sliding panels 41", 42" in the supporting bracket 45", and a holding bracket 46" affixed to the supporting bracket 45" to support the display screen 20" at the rear side 11" of the head pillow 10". Accordingly, the supporting bracket 45" not only reinforces the structure of the head pillow 10" but also supports the sliding panels 41", 42" in a sliding manner.

According to the third embodiment, the car seat head rest further comprises an entertainment unit 21" detachably received with the holding bracket 46", wherein the entertainment unit 21" comprises a disc-media reader 22" electrically linked to the display screen 20" to form a portable media player to detachably supported by the holding bracket 46" at a position that the display screen 20" is supported at the rear side 11" of the head pillow 10".

Accordingly, the entertainment unit 21" forms the portable media player to detachably mount to the head pillow 10". The entertainment unit 21" further comprises a battery that when the entertainment unit 21" is mounted to the head pillow 10", the passenger sitting at the back seat is able to watch movie or TV through the display screen 20" at the rear side 11" of the head pillow 10" by inserting a disc into the entertainment unit 21". Likewise, when the entertainment unit 21" is detached from the head pillow 10", the user is able to carry the entertainment unit 21" from places to places. It is worth to mention that since the head pillow 10" can be mounted to any car seat via the adjustable mounting arrangement, the user is able to fittingly mount the head pillow 10" with the entertainment unit 21" from one vehicle to another vehicle in tool-less manner. In addition, no power cable is required for electrically connecting the entertainment unit 21" with the power source of the vehicle because the entertainment unit 21" is built-in with battery.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A car seat head rest for mounting on a car seat having two spaced apart retention slots, comprising:
    a head pillow having a rear side, a bottom side and an interior cavity;
    a display screen supported at said rear side of said head pillow; and
    an adjustable mounting arrangement, which comprises:
    a length-adjustable sliding guider which is longitudinally supported within said interior cavity of said head pillow, and comprises a control sleeve;
    a supporting frame, which is coupled with said sliding guider, comprising two overlapped sliding panels being overlapped with each other and supported in said interior cavity of said head pillow in a slidably movable manner and two supporting arms downwardly and parallelly extended from two outer edges of said sliding panels respectively through said bottom side of said head pillow to define an engaging distance between said two supporting arms, wherein said control sleeve has two side opening ends and two sliding shafts slidably engaging with said control sleeve at a position that inner ends of said sliding shafts are coaxially and slidably engaging with said side opening ends of said control sleeve respectively while outer ends of said sliding shafts are coupled with said supporting arms respectively, wherein when said inner ends of said two sliding shafts are coaxially slid within said side opening ends of said control sleeve respectively, said sliding panels are slid with each other to move said supporting arms correspondingly in order to control said engaging distance between said two supporting arms, wherein said sliding panels not only rigidly support said head pillow but also provide a stable sliding movement of each of said supporting arms in a synchronized manner; and
    an adjuster provided at said sliding guider to control a length of said sliding guider so as to selectively adjust said engaging distance of said supporting arms, wherein when said engaging distance of said supporting arms is adjusted corresponding to a distance between said two retention slots of said car seat, said two supporting arms are adapted for slidably engaging with said two retention slots respectively so as to securely support said head pillow on said car seat.

2. The car seat head rest, as recited in claim 1, wherein said control sleeve has two inner thread portions provided at said two opening ends respectively, wherein each of said sliding shafts has an outer threaded portion slidably and rotatably engaging with said corresponding inner thread portion of said control sleeve, such that when said control sleeve is driven to rotate via said adjuster, said sliding shafts are slid correspondingly while said sliding panels are overlappedly slid with each other in a synchronized manner to control said engaging distance between said two supporting arms.

3. The car seat head rest, as recited in claim 2, wherein said outer ends of said sliding shafts are formed as two tubular sleeves that said supporting arms are coaxially slid through said tubular sleeves respectively.

4. The car seat head rest, as recited in claim 3, wherein said supporting frame further comprises a sliding enhancement unit for enhancing a sliding movement between said two sliding panels, wherein said sliding enhancement unit contains two sliding slots provided at said sliding panels to align with each other and comprises a driving gear rotatably engaging with said sliding slots to enhance said sliding movement between said sliding panels in a synchronized manner.

5. The car seat head rest, as recited in claim 4, wherein one of said sliding slots has a bottom teething edge engaging with a portion of a teething circumferential edge of said driving gear while another said sliding slot has a top teething edge engaging with an opposed portion of said teething circumferential edge of said driving gear such that said sliding panels are correspondingly slid with each other in a synchronized manner.

6. The car seat head rest, as recited in claim 5, wherein upper end portions of said supporting arms are affixed to said outer edges of said sliding panels respectively.

7. The car seat head rest, as recited in claim 6, wherein said supporting frame comprises a base housing supported within said interior cavity of said head pillow to rigidly support said display screen at said rear side of said head pillow, wherein said sliding panels are supported between a base wall of said base housing and said display screen.

8. The car seat head rest, as recited in claim 2, wherein said supporting frame further comprises a sliding enhancement unit for enhancing a sliding movement between said two sliding panels, wherein said sliding enhancement unit contains two sliding slots provided at said sliding panels to align with each other and comprises a driving gear rotatably engaging with said sliding slots to enhance said sliding movement between said sliding panels in a synchronized manner.

9. The car seat head rest, as recited in claim 8, wherein one of said sliding slots has a bottom teething edge engaging with a portion of a teething circumferential edge of said driving gear while another said sliding slot has a top teething edge engaging with an opposed portion of said teething circumferential edge of said driving gear such that said sliding panels are correspondingly slid with each other in a synchronized manner.

10. The car seat head rest, as recited in claim 9, wherein upper end portions of said supporting arms are affixed to said outer edges of said sliding panels respectively.

11. The car seat head rest, as recited in claim 10, wherein said supporting frame comprises a base housing supported within said interior cavity of said head pillow to rigidly support said display screen at said rear side of said head pillow, wherein said sliding panels are supported between a base wall of said base housing and said display screen.

* * * * *